(No Model.)

A. R. WELLS.
HOOP CLAMP.

No. 407,559. Patented July 23, 1889.

Witnesses,
Geo. H. Strong
J. H. Nurse

Inventor,
Asa R. Wells
By Dewey & Co.
Attys

UNITED STATES PATENT OFFICE.

ASA R. WELLS, OF SAN FRANCISCO, CALIFORNIA.

HOOP-CLAMP.

SPECIFICATION forming part of Letters Patent No. 407,559, dated July 23, 1889.

Application filed May 2, 1889. Serial No. 309,371. (No model.)

*To all whom it may concern:*

Be it known that I, ASA R. WELLS, of the city and county of San Francisco, State of California, have invented an Improvement in Hoop-Clamps; and I hereby declare the following to be a full, clear, and exact description of the same.

My invention relates, generally, to the class of devices adapted to be applied to the ends of hoops for tanks and other similar vessels or cylindrical or circular bodies, for the purpose of drawing said ends together and tightening the hoop, and it relates particularly to that sub-class of these devices in which a left and right hand threaded bolt is seated in opposing heads attached to the hoop ends and by its rotation draws the said heads together.

My invention consists in the constructions and combinations of devices, which I shall hereinafter fully describe, and point out in the claims.

The object of my invention is to provide a hoop-clamp which is adapted to conform itself to the curvature of the hoop, so that the strain which it exerts shall be in the line of said curvature instead of tangential thereto.

Figure 1:
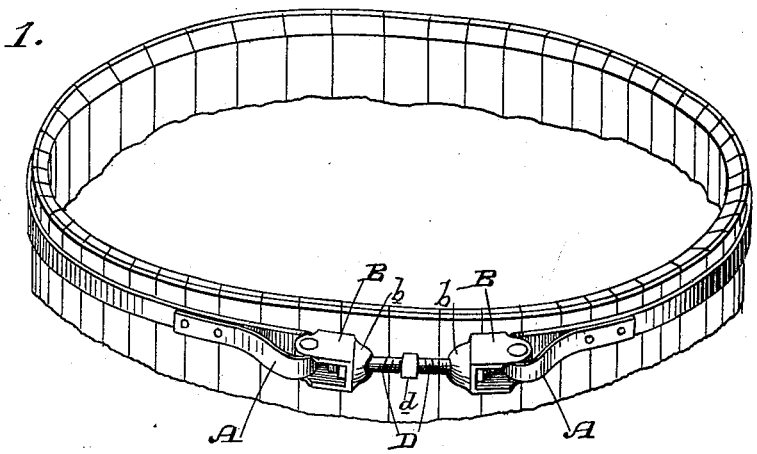
Figure 2:
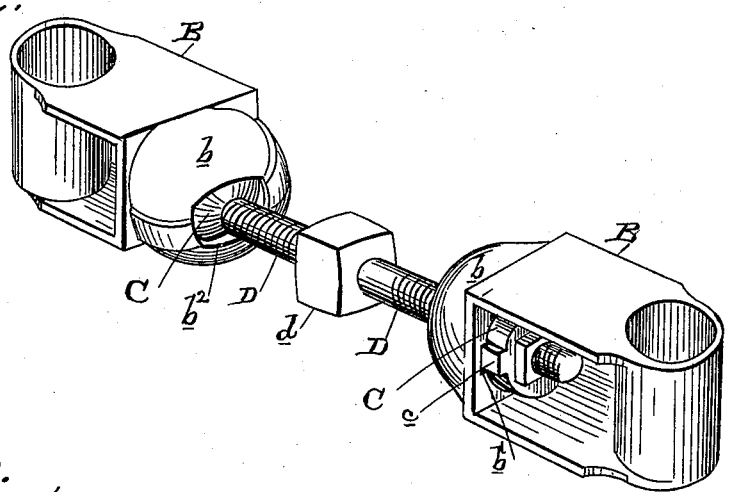
Figure 3:
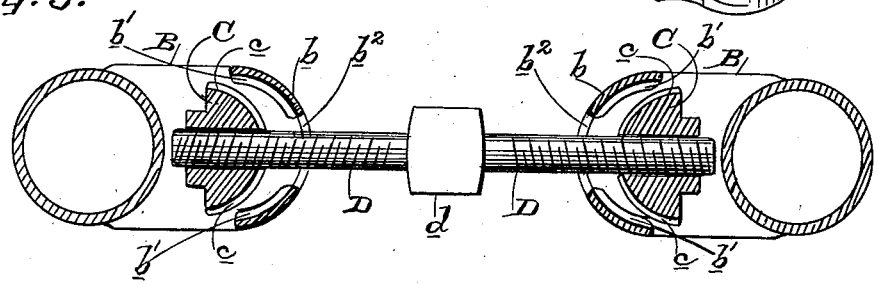

Referring to the accompanying drawings for a more complete explanation of my invention, Figure 1 is a perspective view showing the application of my hoop-clamp. Fig. 2 is a perspective view of my hoop-clamp. Fig. 3 is a horizontal longitudinal section of same.

A are the hoop ends, which are looped around the cylindrical outer ends of the heads B. The inner or adjacent ends of these heads are cast or otherwise formed with hemispherical seats $b$, and in these are fitted the hemispherical nuts C, which are cast or formed with a rib $c$, adapted to fit in a groove $b'$ in the seats $b$, whereby they are prevented from turning on that axis which is in the line of the adjustable bolt, while at liberty to move in their seats on an axis at right angles thereto.

D is the adjusting or tightening bolt of the clamp, having one end provided with a right-hand thread and the other end provided with a left-hand thread, and at the center with a collar or wrench-hold $d$. The threaded ends of this bolt pass freely through elongated apertures $b^2$ in the seats $b$ of the heads and are seated in the hemispherical nuts in said sockets.

The operation of the clamp is as follows: The ends of the hoops are looped around the heads, as shown, and then a wrench is applied to the central collar $d$ of the tightening-bolt. The bolt is turned, and as its reverse threaded ends work in and through their respective nuts the heads are drawn together, thereby tightening the hoop. The strain being on a curve deflects the heads from a straight line, the hemispherical nuts through which the bolt passes turning in their hemispherical seats in the proper direction to enable the clamp to conform itself to the curvature of the hoop, thereby exerting its strength in the line of said curve instead of in a straight line tangential to it. As before mentioned the nuts will remain steady in the direction of rotation of the bolt.

Having thus described my invention, what I claim as new, and desire to secure by Letters Patent, is—

1. In a hoop-clamp, the combination of the opposing heads to which the ends of the hoop are secured, a tightening-bolt extending between said heads, and a connection comprising hemispherical nuts and seats between said bolt and the heads, whereby the latter may conform to the line of curvature of the hoop, substantially as described.

2. A hoop-clamp consisting of the combination of the opposing heads to which the hoop ends are secured, said heads having in their inner or adjacent ends hemispherical seats, hemispherical nuts fitted to said seats, and the tightening-bolt extending between and into the heads and seated in the nuts, whereby the heads may conform themselves to the curvature of the hoop, substantially as described.

3. A hoop-clamp consisting of the combination of the opposing heads to which the ends of the hoops are secured, said heads having in their inner or adjacent ends the hemispherical seats provided with grooves, the hemispherical nuts fitted to said seats and having the ribs fitting in the grooves thereof, and the right and left hand threaded tightening-bolt extending between the heads and seated in the nuts thereof, substantially as herein described.

In witness whereof I have hereunto set my hand.

ASA R. WELLS.

Witnesses:
S. H. NOURSE,
H. C. LEE.